(12) United States Patent
Taniyama

(10) Patent No.: US 7,755,853 B2
(45) Date of Patent: *Jul. 13, 2010

(54) IMAGING LENS

(75) Inventor: Minoru Taniyama, Saitama (JP)

(73) Assignee: Fujinon Corporation, Saitama (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/015,302

(22) Filed: Jan. 16, 2008

(65) Prior Publication Data

US 2008/0180813 A1     Jul. 31, 2008

(30) Foreign Application Priority Data

Jan. 30, 2007   (JP) .......................... P2007-019475

(51) Int. Cl.
  *G02B 9/34*   (2006.01)
  *G02B 13/18*   (2006.01)
(52) U.S. Cl. ...................... 359/773; 359/715
(58) Field of Classification Search ................ 359/359, 359/773, 713–715
See application file for complete search history.

(56) References Cited

U.S. PATENT DOCUMENTS

| | | | |
|---|---|---|---|
| 6,476,982 B1 | 11/2002 | Kawakami | |
| 7,061,694 B2 * | 6/2006 | Amanai | 359/773 |
| 7,274,518 B1 * | 9/2007 | Tang et al. | 359/772 |
| 7,295,386 B2 * | 11/2007 | Taniyama | 359/772 |
| 7,375,903 B2 * | 5/2008 | Taniyama | 359/715 |
| 2007/0008625 A1 | 1/2007 | Park et al. | |

FOREIGN PATENT DOCUMENTS

| | | |
|---|---|---|
| JP | 64-48516 A | 2/1989 |
| JP | 10-48516 A | 2/1998 |
| JP | 2002-221659 A | 8/2002 |
| JP | 2004-302057 A | 10/2004 |
| JP | 2004-341013 A | 12/2004 |
| JP | 2005-24581 A | 1/2005 |
| JP | 2005-24889 A | 1/2005 |
| JP | 2005-208236 | 8/2005 |

* cited by examiner

*Primary Examiner*—Scott J Sugarman
(74) *Attorney, Agent, or Firm*—Birch, Stewart, Kolasch & Birch, LLP

(57) ABSTRACT

An imaging lens is provided and includes: in order from an object side of the imaging lens, a first lens having a positive refractive power and having a convex surface on the object side; a second lens having a negative refractive power and having a concave surface on the object side; a third lens having a positive refractive power in the vicinity of an optical axis thereof; and a fourth lens of a meniscus lens having a negative refractive power and having a convex surface on the object side, the imaging lens satisfying the specific conditional expressions.

37 Claims, 15 Drawing Sheets

EXAMPLE 1

EXAMPLE 3

EXAMPLE 4

EXAMPLE 5

EXAMPLE 6

EXAMPLE 7

FIG. 8A

AD: APERTURE DIAPHRAGM

| EXAMPLE 1: BASIC LENS DATA | | | | |
|---|---|---|---|---|
| Si (SURFACE NUMBER) | Ri (RADIUS OF CURVATURE) | Di (SURFACE SPACING) | Ndj (REFRACTIVE INDEX) | $\nu$dj (ABBE NUMBER) |
| 0 (AD) | — | −0.18 | — | — |
| 1 | 1.855 | 1.12 | 1.471 | 76.6 |
| 2 | 16.589 | 0.91 | | |
| 3 | −1.742 | 0.62 | 1.606 | 27 |
| 4 | −4.762 | 0.11 | | |
| 5 | 5.121 | 0.74 | 1.510 | 56.2 |
| 6 | 742.880 | 0.16 | | |
| 7 | 1.900 | 0.90 | 1.510 | 56.2 |
| 8 | 1.623 | 0.70 | | |
| 9 | ∞ | 0.30 | 1.516 | 64.1 |
| 10 | ∞ | 0.74 | | |

(f=5.36, Fno.=2.80)

FIG. 8B

*: ASPHERICAL COEFFICIENT

| EXAMPLE 1: ASPHERICAL DATA | | | | |
|---|---|---|---|---|
| * | SURFACE NUMBER | | | |
| | FIRST SURFACE | SECOND SURFACE | THIRD SURFACE | FOURTH SURFACE |
| K | 2.158E+00 | 4.577E+00 | 1.588E+00 | 4.387E+00 |
| A3 | −9.394E−03 | −8.194E−03 | −4.775E−02 | −1.058E−01 |
| A4 | 1.242E−02 | 5.175E−03 | −5.859E−03 | −9.139E−02 |
| A5 | −5.745E−02 | −1.135E−02 | 8.479E−02 | 1.391E−01 |
| A6 | 9.691E−03 | −9.185E−03 | −4.653E−02 | 5.804E−03 |
| A7 | 1.292E−02 | 1.034E−02 | −4.577E−02 | −3.352E−02 |
| A8 | 4.530E−03 | 5.306E−03 | 3.025E−02 | −8.850E−03 |
| A9 | −1.483E−02 | −2.672E−02 | 6.382E−02 | 7.519E−03 |
| A10 | −6.386E−03 | 7.381E−03 | −5.533E−02 | 1.901E−03 |
| | FIFTH SURFACE | SIXTH SURFACE | SEVENTH SURFACE | EIGHTH SURFACE |
| K | −7.082E+01 | −9.990E+00 | −1.149E+01 | −4.273E+00 |
| A3 | −9.247E−02 | 1.680E−02 | 6.938E−02 | 1.988E−02 |
| A4 | 7.870E−02 | −1.226E−03 | −7.495E−02 | −6.258E−02 |
| A5 | 5.991E−03 | −4.776E−03 | −5.149E−03 | 2.272E−02 |
| A6 | −1.352E−02 | −7.631E−04 | 3.734E−03 | −4.155E−03 |
| A7 | −1.083E−02 | −1.399E−03 | 3.110E−03 | −9.694E−04 |
| A8 | 7.005E−04 | −4.773E−04 | −5.406E−04 | 5.533E−04 |
| A9 | 4.061E−03 | 3.851E−04 | −1.040E−04 | 8.198E−05 |
| A10 | −1.319E−03 | −3.188E−05 | 3.370E−06 | −4.610E−05 |

FIG. 9A

AD: APERTURE DIAPHRAGM

| Si (SURFACE NUMBER) | Ri (RADIUS OF CURVATURE) | Di (SURFACE SPACING) | Ndj (REFRACTIVE INDEX) | νdj (ABBE NUMBER) |
|---|---|---|---|---|
| 0 (AD) | — | −0.15 | — | — |
| 1 | 1.903 | 1.11 | 1.471 | 76.6 |
| 2 | 30.094 | 0.92 | | |
| 3 | −1.730 | 0.62 | 1.606 | 27 |
| 4 | −5.340 | 0.11 | | |
| 5 | 4.894 | 0.86 | 1.510 | 56.2 |
| 6 | −19.990 | 0.16 | | |
| 7 | 1.900 | 0.82 | 1.510 | 56.2 |
| 8 | 1.535 | 0.70 | | |
| 9 | ∞ | 0.30 | 1.516 | 64.1 |
| 10 | ∞ | 0.73 | | |

(f=5.33, Fno.=2.80)

FIG. 9B

*: ASPHERICAL COEFFICIENT

EXAMPLE 2: ASPHERICAL DATA

| * | SURFACE NUMBER | | | |
|---|---|---|---|---|
| | FIRST SURFACE | SECOND SURFACE | THIRD SURFACE | FOURTH SURFACE |
| K | 1.500E+00 | −1.000E+01 | 1.584E+00 | 7.331E+00 |
| A3 | −1.538E−03 | −5.903E−03 | −2.040E−02 | −8.872E−02 |
| A4 | −3.932E−03 | −3.312E−03 | −4.700E−02 | −9.901E−02 |
| A5 | −2.256E−02 | −1.773E−03 | 9.931E−02 | 1.345E−01 |
| A6 | 1.461E−02 | −2.171E−02 | −2.138E−02 | 5.190E−03 |
| A7 | 4.769E−04 | 4.240E−03 | −4.627E−02 | −3.177E−02 |
| A8 | −2.046E−03 | 1.413E−02 | 1.134E−02 | −6.959E−03 |
| A9 | −9.864E−03 | −1.620E−02 | 5.221E−02 | 8.132E−03 |
| A10 | 2.539E−03 | −1.380E−03 | −3.745E−02 | 1.027E−03 |
| | FIFTH SURFACE | SIXTH SURFACE | SEVENTH SURFACE | EIGHTH SURFACE |
| K | −4.014E+01 | −1.003E+01 | −8.054E+00 | −3.739E+00 |
| A3 | −1.025E−01 | 8.847E−03 | 3.370E−02 | 1.971E−02 |
| A4 | 7.630E−02 | 7.791E−04 | −6.697E−02 | −7.112E−02 |
| A5 | 3.191E−03 | −4.104E−03 | −3.317E−03 | 2.635E−02 |
| A6 | −1.235E−02 | −4.233E−04 | 3.462E−03 | −3.678E−03 |
| A7 | −9.816E−03 | −1.537E−03 | 2.804E−03 | −1.178E−03 |
| A8 | 8.034E−04 | −6.487E−04 | −5.903E−04 | 4.654E−04 |
| A9 | 3.786E−03 | 3.800E−04 | −1.061E−04 | 8.362E−05 |
| A10 | −1.420E−03 | −3.077E−05 | 2.173E−05 | −3.997E−05 |

FIG. 10A

AD: APERTURE DIAPHRAGM

EXAMPLE 3: BASIC LENS DATA

| Si (SURFACE NUMBER) | Ri (RADIUS OF CURVATURE) | Di (SURFACE SPACING) | Ndj (REFRACTIVE INDEX) | $\nu$dj (ABBE NUMBER) |
|---|---|---|---|---|
| 0(AD) | — | −0.16 | — | — |
| 1 | 2.020 | 1.17 | 1.542 | 62.9 |
| 2 | 25.164 | 0.85 | | |
| 3 | −1.756 | 0.60 | 1.606 | 27 |
| 4 | −7.591 | 0.10 | | |
| 5 | 5.004 | 1.00 | 1.510 | 56.2 |
| 6 | −31.054 | 0.16 | | |
| 7 | 2.016 | 0.88 | 1.510 | 56.2 |
| 8 | 1.717 | 0.70 | | |
| 9 | ∞ | 0.30 | 1.516 | 64.1 |
| 10 | ∞ | 0.56 | | |

(f=5.36, Fno.=3.20)

FIG. 10B

*: ASPHERICAL COEFFICIENT

EXAMPLE 3: ASPHERICAL DATA

| * | SURFACE NUMBER | | | |
|---|---|---|---|---|
| | FIRST SURFACE | SECOND SURFACE | THIRD SURFACE | FOURTH SURFACE |
| K | 2.136E+00 | −1.001E+01 | 1.819E+00 | 2.809E+00 |
| A3 | −3.470E−03 | −5.423E−03 | −1.123E−02 | −9.865E−02 |
| A4 | −3.579E−03 | −1.363E−02 | −7.043E−02 | −8.980E−02 |
| A5 | −4.056E−02 | 1.517E−03 | 1.113E−01 | 1.375E−01 |
| A6 | 2.302E−02 | −2.236E−02 | −6.378E−03 | 7.529E−03 |
| A7 | 9.422E−03 | −2.605E−03 | −4.268E−02 | −2.898E−02 |
| A8 | −1.028E−02 | 1.263E−02 | 5.796E−03 | −5.101E−03 |
| A9 | −2.736E−02 | −7.997E−03 | 4.614E−02 | 8.180E−03 |
| A10 | 1.515E−02 | −6.315E−03 | −3.887E−02 | −7.236E−04 |
| | FIFTH SURFACE | SIXTH SURFACE | SEVENTH SURFACE | EIGHTH SURFACE |
| K | −5.003E+01 | 1.001E+01 | −8.609E+00 | −5.251E+00 |
| A3 | −1.161E−01 | −6.484E−03 | 2.123E−02 | 3.790E−02 |
| A4 | 7.510E−02 | −1.328E−02 | −6.289E−02 | −8.028E−02 |
| A5 | 7.682E−03 | −2.401E−03 | −4.451E−03 | 2.781E−02 |
| A6 | −1.110E−02 | 9.032E−04 | 2.979E−03 | −3.631E−03 |
| A7 | −9.903E−03 | −1.038E−03 | 2.758E−03 | −1.229E−03 |
| A8 | 8.096E−04 | −4.998E−04 | −5.690E−04 | 4.548E−04 |
| A9 | 3.973E−03 | 4.010E−04 | −8.675E−05 | 8.125E−05 |
| A10 | −1.244E−03 | −4.682E−05 | 3.195E−05 | −4.124E−05 |

FIG. 11A

AD: APERTURE DIAPHRAGM

| EXAMPLE 4: BASIC LENS DATA ||||||
| Si (SURFACE NUMBER) | Ri (RADIUS OF CURVATURE) | Di (SURFACE SPACING) | Ndj (REFRACTIVE INDEX) | νdj (ABBE NUMBER) |
|---|---|---|---|---|
| 0 (AD) | — | -0.18 | — | — |
| 1 | 2.227 | 1.23 | 1.592 | 68.3 |
| 2 | 15.234 | 0.85 | | |
| 3 | -2.023 | 0.60 | 1.606 | 27 |
| 4 | -8.881 | 0.10 | | |
| 5 | 5.133 | 0.99 | 1.510 | 56.2 |
| 6 | -20.048 | 0.14 | | |
| 7 | 2.041 | 0.96 | 1.510 | 56.2 |
| 8 | 1.716 | 0.70 | | |
| 9 | ∞ | 0.30 | 1.516 | 64.1 |
| 10 | ∞ | 0.47 | | |

(f=5.14, Fno.=2.80)

FIG. 11B

*: ASPHERICAL COEFFICIENT

| EXAMPLE 4: ASPHERICAL DATA |||||
| * | SURFACE NUMBER ||||
| | FIRST SURFACE | SECOND SURFACE | THIRD SURFACE | FOURTH SURFACE |
|---|---|---|---|---|
| K | 2.092E+00 | -1.009E+01 | 1.202E+00 | 8.306E+00 |
| A3 | -4.053E-03 | -6.183E-03 | -2.107E-02 | -9.367E-02 |
| A4 | 4.240E-03 | -5.375E-03 | -7.152E-02 | -9.115E-02 |
| A5 | -3.804E-02 | 2.274E-03 | 9.880E-02 | 1.365E-01 |
| A6 | 2.029E-02 | -2.102E-02 | -7.231E-03 | 6.727E-03 |
| A7 | 9.797E-03 | 1.718E-03 | -4.055E-02 | -2.932E-02 |
| A8 | -5.423E-03 | 1.130E-02 | 3.777E-03 | -5.078E-03 |
| A9 | -2.198E-02 | -9.828E-03 | 3.733E-02 | 8.320E-03 |
| A10 | 1.196E-02 | -1.240E-03 | -2.937E-02 | -9.541E-04 |
| | FIFTH SURFACE | SIXTH SURFACE | SEVENTH SURFACE | EIGHTH SURFACE |
| K | -4.268E+01 | 9.630E+00 | -9.552E+00 | -5.665E+00 |
| A3 | -1.112E-01 | -3.227E-03 | 3.283E-02 | 4.995E-02 |
| A4 | 7.917E-02 | -1.238E-02 | -6.139E-02 | -7.859E-02 |
| A5 | 7.652E-03 | -4.474E-04 | -4.394E-03 | 2.720E-02 |
| A6 | -1.096E-02 | 1.470E-03 | 3.034E-03 | -3.925E-03 |
| A7 | -9.658E-03 | -1.007E-03 | 2.808E-03 | -1.246E-03 |
| A8 | 9.236E-04 | -5.381E-04 | -5.572E-04 | 4.648E-04 |
| A9 | 3.946E-03 | 3.607E-04 | -9.664E-05 | 8.621E-05 |
| A10 | -1.359E-03 | -7.812E-05 | 2.045E-05 | -3.895E-05 |

FIG. 12A

AD: APERTURE DIAPHRAGM

| EXAMPLE 5: BASIC LENS DATA | | | | |
|---|---|---|---|---|
| Si (SURFACE NUMBER) | Ri (RADIUS OF CURVATURE) | Di (SURFACE SPACING) | Ndj (REFRACTIVE INDEX) | νdj (ABBE NUMBER) |
| 0 (AD) | — | -0.15 | — | — |
| 1 | 1.921 | 1.11 | 1.471 | 76.6 |
| 2 | 29.525 | 0.92 | | |
| 3 | -1.727 | 0.61 | 1.606 | 27 |
| 4 | -7.486 | 0.11 | | |
| 5 | 4.095 | 0.96 | 1.510 | 56.2 |
| 6 | -8.778 | 0.16 | | |
| 7 | 1.898 | 0.80 | 1.510 | 56.2 |
| 8 | 1.440 | 0.70 | | |
| 9 | ∞ | 0.30 | 1.516 | 64.1 |
| 10 | ∞ | 0.77 | | |

(f=5.35, Fno.=2.80)

FIG. 12B

*: ASPHERICAL COEFFICIENT

| EXAMPLE 5: ASPHERICAL DATA | | | | |
|---|---|---|---|---|
| * | SURFACE NUMBER | | | |
| | FIRST SURFACE | SECOND SURFACE | THIRD SURFACE | FOURTH SURFACE |
| K | 1.357E+00 | -1.124E+01 | 1.553E+00 | 1.068E+01 |
| A3 | -1.323E-03 | -3.953E-03 | -2.109E-02 | -9.306E-02 |
| A4 | -2.020E-03 | -8.534E-03 | -4.191E-02 | -1.027E-01 |
| A5 | -1.822E-02 | 8.128E-03 | 9.880E-02 | 1.333E-01 |
| A6 | 1.269E-02 | -2.379E-02 | -2.026E-02 | 4.755E-03 |
| A7 | -1.986E-03 | -8.165E-05 | -4.625E-02 | -3.185E-02 |
| A8 | -7.069E-05 | 1.499E-02 | 9.320E-03 | -6.942E-03 |
| A9 | -5.805E-03 | -1.258E-02 | 5.066E-02 | 8.051E-03 |
| A10 | 3.433E-04 | -2.806E-03 | -3.554E-02 | 7.662E-04 |
| | FIFTH SURFACE | SIXTH SURFACE | SEVENTH SURFACE | EIGHTH SURFACE |
| K | -2.981E+01 | -1.028E+01 | -7.172E+00 | -3.395E+00 |
| A3 | -1.034E-01 | 1.308E-02 | 3.219E-02 | 1.972E-02 |
| A4 | 7.584E-02 | 2.104E-03 | -6.757E-02 | -7.189E-02 |
| A5 | 2.879E-03 | -3.972E-03 | -3.072E-02 | 2.647E-02 |
| A6 | -1.220E-02 | -4.502E-04 | 3.592E-03 | -3.547E-03 |
| A7 | -9.579E-03 | -1.590E-03 | 2.811E-03 | -1.130E-03 |
| A8 | 9.023E-04 | -7.023E-04 | -6.013E-04 | 4.686E-04 |
| A9 | 3.748E-03 | 3.520E-04 | -1.135E-04 | 8.058E-05 |
| A10 | -1.502E-03 | -3.446E-05 | 1.698E-05 | -4.132E-05 |

FIG. 13A

AD: APERTURE DIAPHRAGM

| EXAMPLE 6: BASIC LENS DATA | | | | |
|---|---|---|---|---|
| Si (SURFACE NUMBER) | Ri (RADIUS OF CURVATURE) | Di (SURFACE SPACING) | Ndj (REFRACTIVE INDEX) | $\nu$dj (ABBE NUMBER) |
| 0 (AD) | — | 0.00 | — | — |
| 1 | 2.030 | 1.12 | 1.471 | 76.6 |
| 2 | -70.616 | 0.92 | | |
| 3 | -1.730 | 0.62 | 1.606 | 27 |
| 4 | -52.019 | 0.10 | | |
| 5 | 3.255 | 1.03 | 1.510 | 56.2 |
| 6 | -5.635 | 0.15 | | |
| 7 | 1.850 | 0.96 | 1.510 | 56.2 |
| 8 | 1.369 | 0.70 | | |
| 9 | ∞ | 0.30 | 1.516 | 64.1 |
| 10 | ∞ | 0.57 | | |

(f=5.09, Fno.=2.80)

FIG. 13B

*: ASPHERICAL COEFFICIENT

| EXAMPLE 6: ASPHERICAL DATA | | | | |
|---|---|---|---|---|
| * | SURFACE NUMBER | | | |
| | FIRST SURFACE | SECOND SURFACE | THIRD SURFACE | FOURTH SURFACE |
| K | 9.589E-01 | 1.000E+01 | 8.510E-01 | 1.000E+01 |
| A3 | -1.153E-03 | 2.246E-03 | -2.559E-02 | -1.048E-01 |
| A4 | 9.464E-04 | -3.687E-02 | -6.718E-02 | -1.125E-01 |
| A5 | -1.056E-02 | 3.256E-02 | 7.054E-02 | 1.291E-01 |
| A6 | 7.670E-03 | -3.159E-02 | -1.668E-03 | 2.198E-03 |
| A7 | -1.134E-02 | -1.367E-02 | -3.173E-02 | -3.175E-02 |
| A8 | 5.573E-03 | 1.583E-02 | -6.502E-03 | -5.199E-03 |
| A9 | 8.911E-03 | -3.270E-03 | 2.724E-02 | 9.165E-03 |
| A10 | -1.170E-02 | -7.113E-03 | -2.108E-02 | -4.234E-04 |
| | FIFTH SURFACE | SIXTH SURFACE | SEVENTH SURFACE | EIGHTH SURFACE |
| K | -1.073E+01 | -1.061E+01 | -5.466E+00 | -2.837E+00 |
| A3 | -9.863E-02 | 3.559E-02 | 4.600E-02 | 2.686E-02 |
| A4 | 7.319E-02 | 4.794E-03 | -6.444E-02 | -7.146E-02 |
| A5 | 3.189E-03 | -6.375E-03 | -2.473E-03 | 2.828E-02 |
| A6 | -1.072E-02 | -5.864E-04 | 3.488E-03 | -3.494E-03 |
| A7 | -8.759E-03 | -1.126E-03 | 2.711E-03 | -1.306E-03 |
| A8 | 1.018E-03 | -4.531E-04 | -6.314E-04 | 3.911E-04 |
| A9 | 3.670E-03 | 3.862E-04 | -1.164E-04 | 7.195E-05 |
| A10 | -1.361E-03 | -7.599E-05 | 1.801E-05 | -2.893E-05 |

FIG. 14A

AD: APERTURE DIAPHRAGM

| EXAMPLE 7: BASIC LENS DATA ||||| 
|---|---|---|---|---|
| Si (SURFACE NUMBER) | Ri (RADIUS OF CURVATURE) | Di (SURFACE SPACING) | Ndj (REFRACTIVE INDEX) | νdj (ABBE NUMBER) |
| 0 (AD) | — | 0.00 | — | — |
| 1 | 2.081 | 1.12 | 1.471 | 76.6 |
| 2 | −93.174 | 0.92 | | |
| 3 | −1.826 | 0.62 | 1.606 | 27 |
| 4 | −54.807 | 0.10 | | |
| 5 | 3.363 | 0.98 | 1.510 | 56.2 |
| 6 | −6.173 | 0.15 | | |
| 7 | 1.794 | 0.98 | 1.510 | 56.2 |
| 8 | 1.381 | 0.70 | | |
| 9 | ∞ | 0.30 | 1.516 | 64.1 |
| 10 | ∞ | 0.60 | | |

(f=5.03, Fno.=2.80)

FIG. 14B

*: ASPHERICAL COEFFICIENT

| EXAMPLE 7: ASPHERICAL DATA |||||
|---|---|---|---|---|
| * | SURFACE NUMBER ||||
| | FIRST SURFACE | SECOND SURFACE | THIRD SURFACE | FOURTH SURFACE |
| K | 8.827E−01 | −1.000E+01 | 7.265E−01 | 9.824E+00 |
| A3 | −5.434E−04 | 1.993E−03 | −2.161E−02 | −9.865E−02 |
| A4 | −2.864E−04 | −3.313E−02 | −6.573E−02 | −1.132E−01 |
| A5 | −6.287E−03 | 3.474E−02 | 6.705E−02 | 1.296E−01 |
| A6 | 8.250E−03 | −3.285E−02 | 4.208E−03 | 2.657E−03 |
| A7 | −1.428E−02 | −1.417E−02 | −2.913E−02 | −3.146E−02 |
| A8 | 4.535E−03 | 1.710E−02 | −8.977E−03 | −5.227E−03 |
| A9 | 1.153E−02 | −1.580E−03 | 2.527E−02 | 8.919E−03 |
| A10 | −1.161E−02 | −7.654E−03 | −1.879E−02 | −6.042E−04 |
| | FIFTH SURFACE | SIXTH SURFACE | SEVENTH SURFACE | EIGHTH SURFACE |
| K | −8.041E+00 | −1.017E+01 | −4.499E+00 | −2.423E+00 |
| A3 | −1.005E−01 | 3.993E−02 | 4.754E−02 | 2.423E−02 |
| A4 | 7.349E−02 | 5.493E−03 | −6.385E−02 | −7.138E−02 |
| A5 | 3.566E−03 | −6.617E−03 | −2.240E−03 | 2.862E−02 |
| A6 | −1.038E−02 | −6.134E−04 | 3.529E−03 | −3.452E−03 |
| A7 | −8.700E−03 | −1.074E−03 | 2.718E−03 | −1.311E−03 |
| A8 | 9.524E−04 | −4.241E−04 | −6.301E−04 | 3.877E−04 |
| A9 | 3.628E−03 | 3.924E−04 | −1.173E−04 | 7.151E−05 |
| A10 | −1.326E−03 | −8.083E−05 | 1.621E−05 | −2.858E−05 |

FIG. 15
|  | CONDITIONAL EXPRESSION (1) f1/f | CONDITIONAL EXPRESSION (2) n1 | CONDITIONAL EXPRESSION (3) ν1 | CONDITIONAL EXPRESSION (4) \|f2/f\| | CONDITIONAL EXPRESSION (5) f3/f |
|---|---|---|---|---|---|
| EXAMPLE 1 | 0.81 | 1.471 | 76.6 | 0.92 | 1.89 |
| EXAMPLE 2 | 0.80 | 1.471 | 76.6 | 0.85 | 1.46 |
| EXAMPLE 3 | 0.74 | 1.542 | 62.9 | 0.73 | 1.59 |
| EXAMPLE 4 | 0.83 | 1.592 | 68.3 | 0.87 | 1.58 |
| EXAMPLE 5 | 0.80 | 1.471 | 76.6 | 0.72 | 1.05 |
| EXAMPLE 6 | 0.83 | 1.471 | 76.6 | 0.58 | 0.83 |
| EXAMPLE 7 | 0.86 | 1.471 | 76.6 | 0.62 | 0.88 |
EXAMPLE 1
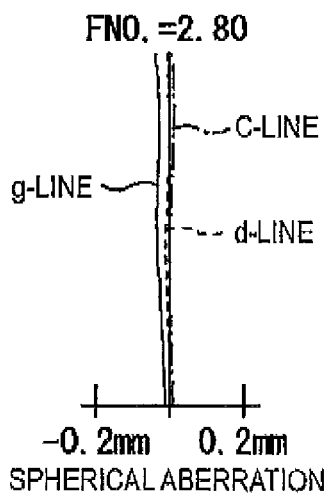
FIG. 16A
SPHERICAL ABERRATION
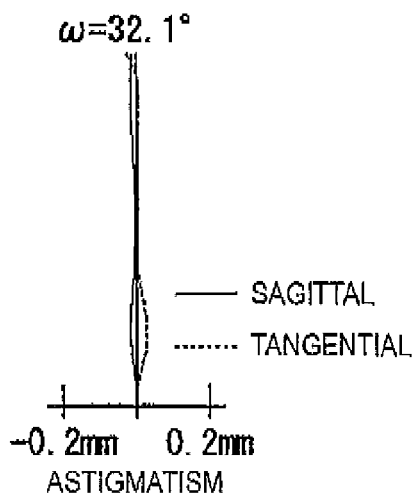
FIG. 16B
ASTIGMATISM
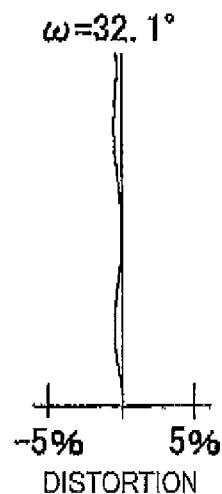
FIG. 16C
DISTORTION

EXAMPLE 2

EXAMPLE 3

EXAMPLE 4

EXAMPLE 5

EXAMPLE 6

EXAMPLE 7

IMAGING LENS

BACKGROUND OF THE INVENTION

1. Field of the Invention

The present invention relates to an imaging lens having a fixed focal point which is suitable for being incorporated into a digital camera using an imaging element, such as a CCD (Charge-Coupled Device) or CMOS (Complementary Metal Oxide Semiconductor), or a compact imaging device such as a camera using a silver film.

2. Description of Related Art

In step with recent popularization of personal computers into ordinary households, a digital still camera capable of inputting image information, such as a captured landscape or portrait, into a personal computer (hereinafter simply called a "digital camera") has become quickly widespread. Moreover, there is an increase in the number of cases where a portable cellular phone is equipped with a module camera (a portable module camera) for inputting an image.

An imaging element, such as CCD or CMOS, is used in these imaging devices. With a progress in miniaturization of the imaging elements, there is a demand for miniaturization of an overall imaging device and an imaging element incorporated into the imaging device. Simultaneously, the number of pixels in an imaging element is also on the increase, and higher resolution and performance of the imaging lens are demanded.

Accordingly, JP-A-10-48516, JP-A-2002-221659, JP-A-2004-302057, JP-A-2004-341013, JP-A-2005-24581 and JP-A-2005-24889 describe an imaging lens which is built from three or four lenses and which utilizes aspheric surfaces. For example, in JP-A-2004-341013, JP-A-2005-24581 and JP-A-2005-24889, an attempt is made to achieve further miniaturization and higher performance by means of power arrangement of four lenses, in order from an object side, positive power (positive refractive power), negative power (negative refractive power), positive power, and positive power and using an aspheric surface for each of the lens surfaces. An absolute value of a radius of curvature of an image-side surface of a third lens is reduced, to thus impart comparatively-high positive power to the image-side surface.

As mentioned above, progress has recently been made in miniaturizing an imaging element and increasing the number of pixels thereof. With the progress, higher resolution performance and further miniaturization of a configuration are requested particularly of an imaging lens for use in a digital camera. Although primary demands for an imaging lens for use in a portable module camera have hitherto been cost and miniaturization, there is recently a tendency toward an increase in the number of pixels of an imaging element even in connection with the portable module camera, and a demand for higher performance of the imaging lens is also increasing.

Therefore, development of a wide variety of lenses which are generally enhanced in terms of cost, imaging performance, and compactness is desired. For instance, development of a low-cost high-performance imaging lens which ensures compactness enabling incorporation into a portable module camera with an eye toward incorporation into a digital camera in terms of performance are desired.

In order to meet the demands, an example conceivable measure is to adopt three or four lenses with a view toward miniaturization and cost reduction and to actively use an aspheric surface in order to enhance performance. In this case, an aspheric surface contributes to miniaturization and enhancement of performance but is disadvantageous in terms of ease of manufacture and likely to induce an increase in cost. Hence, it is desirable to taken into sufficient consideration ease of manufacture at the time of use of the aspherical surface. The lenses described in the documents mentioned above adopt a configuration where three or four aspherical surfaces are used. However, in terms of achievement of both imaging performance and compactness, the configuration is insufficient.

SUMMARY OF THE INVENTION

An object of an illustrative, non-limiting embodiment of the invention is to provide an imaging lens which exhibits high imaging performance with a compact configuration.

According to an aspect of the invention, there is provide an imaging lens including: in order from an object side of the imaging lens, a first lens having a positive refractive power and having a convex surface on the object side; a second lens having a negative refractive power and having a concave surface on the object side; a third lens having a positive refractive power; and a fourth lens of a meniscus lens having a negative refractive power and having a convex surface on the object side, and satisfying conditional expressions below:

$$0.6 < f1/f < 1.0 \quad (1)$$

$$1.45 < n1 < 1.6 \quad (2)$$

$$v1 > 60 \quad (3)$$

$$0.4 < |f2/f| < 1.2 \quad (4)$$

$$0.7 < f3/f < 1.9 \quad (5)$$

where f represents a focal length of the imaging lens; f1 represents a focal length of the first lens; n1 represents a refractive index of the first lens at the d-line; v1 represents an Abbe number of the first lens at the d-line; f2 represents a focal length of the second lens; and f3 represents a focal length of a third lens.

An imaging lens according to an aspect of the present invention includes four lenses as a whole, and shapes and powers (refractive powers) of the respective lenses are appropriately set, and specific conditional expressions are satisfied, whereby high aberration performance is maintained. Specifically, as a result of the first lens satisfying the conditional expression (1) an increase in size of the imaging lens and an increase in aspherical aberration are prevented. Moreover, as a result of the first lens satisfying the conditional expressions (2) and (3), longitudinal chromatic aberration is reduced. Further, as a result of the second lens and the third lens satisfying the conditional expression (4) and (5), high-order aberration, such as spherical aberration, comatic aberration, and the like, are corrected well, and there becomes advantageous in terms of miniaturization.

In an imaging lens according to an aspect of the present invention, an absolute value of a radius of curvature of the object-side surface of the third lens in the vicinity of the optical axis may be smaller than an absolute value of a radius of curvature of the image-side surface of the third lens in the vicinity of the optical axis. In this manner, comparatively-strong positive power is imparted to the object-side surface, whereby the imaging lens becomes more advantageous in terms of miniaturization and higher performance.

In an imaging lens according to an aspect of the present invention, each of the first lens, the second lens, the third lens, and the fourth lens may have at least one aspherical surface. Thereby, high aberration performance becomes ease to maintain. Moreover, the first lens may be made of an optical glass;

and each of the second lens, the third lens, and the fourth lens may be made of a resin material. As a result, various aberrations (especially, chromatic aberration) are lessened, whereby the imaging lens becomes advantageous in terms of reduction in weight.

In an imaging lens according to an aspect of the present invention, an aperture diaphragm may be disposed between a position of an object-side surface of the first lens on the optical axis and a position of an image-side surface of the first lens on the optical axis. As a result) the imaging lens becomes advantageous to miniaturize the entire length of the lens.

BRIEF DESCRIPTION OF THE DRAWINGS

The features of the invention will appear more fully upon consideration of the exemplary embodiment of the invention, which are schematically set forth in the drawings, in which:

FIG. 8 is a view showing lens data pertaining to the imaging lens of Example 1 of the present invention, wherein FIG. 5A shows basic lens data and FIG. 5B shows lens data pertaining to an aspherical surface;

FIG. 9 is a view showing lens data pertaining to the imaging lens of Example 2 of the present invention, wherein FIG. 9A shows basic lens data and FIG. 9B shows lens data pertaining to an aspherical surface;

FIG. 10 is a view showing lens data pertaining to the imaging lens of Example 3 of the present invention, wherein FIG. 10A shows basic lens data and FIG. 10B shows lens data pertaining to an aspherical surface;

FIG. 11 is a view showing lens data pertaining to the imaging lens of Example 4 of the present invention, wherein FIG. 11A shows basic lens data and FIG. 11B shows lens data pertaining to an aspherical surface;

FIG. 12 is a view showing lens data pertaining to the imaging lens of Example 5 of the present invention, wherein FIG. 12A shows basic lens data and FIG. 12B shows lens data pertaining to an aspherical surface;

FIG. 13 is a view showing lens data pertaining to the imaging lens of Example 6 of the present invention, wherein FIG. 13A shows basic lens data and FIG. 13B shows lens data pertaining to an aspherical surface;

FIG. 14 is a view showing lens data pertaining to the imaging lens of Example 7 of the present invention, wherein FIG. 14A shows basic lens data and FIG. 14B shows lens data pertaining to an aspherical surface;

FIG. 15 is a view collectively showing values pertaining to conditional expressions according to each of Examples;

FIG. 16 is an aberration diagram showing various aberrations of the imaging lens of Example 1 of the present invention, wherein FIG. 16A shows a spherical aberration, FIG. 16B shows astigmatism, and FIG. 16C shows distortion;

FIG. 17 is an aberration diagram showing various aberrations of the imaging lens of Example 2 of the present invention, wherein

FIG. 18 is an aberration diagram showing various aberrations of the imaging lens of Example 3 of the present invention, wherein

FIG. 19 is an aberration diagram showing various aberrations of the imaging lens of Example 4 of the present invention, wherein

FIG. 20 is an aberration diagram showing various aberrations of the imaging lens of Example 5 of the present invention, wherein

FIG. 21 is an aberration diagram showing various aberrations of the imaging lens of Example 6 of the present invention, wherein FIG. 22 is an aberration diagram showing various aberrations of the imaging lens of Example 7 of the present invention, wherein

DETAILED DESCRIPTION OF THE EXEMPLARY EMBODIMENTS

Although the invention will be described below with reference to exemplary embodiments thereof, the following exemplary embodiments and modifications do not restrict the invention.

An imaging lens according to an exemplary embodiment of the present invention has: in order from the object side, a first lens having a positive refractive power and having a convex surface on the object side; a second lens having a negative refractive power and having a concave surface on the object side; a third lens having a positive refractive power in the vicinity of an optical axis thereof, and a fourth lens of a meniscus lens having a negative refractive power and having a convex surface on the object side, and satisfies all of the conditional expressions (1) through (5). Hence, miniaturization of the imaging lens and acquisition of high imaging performance can be ensured.

Exemplary embodiments of the present invention will be described in detail hereunder by reference to the drawings.

Figure 1:
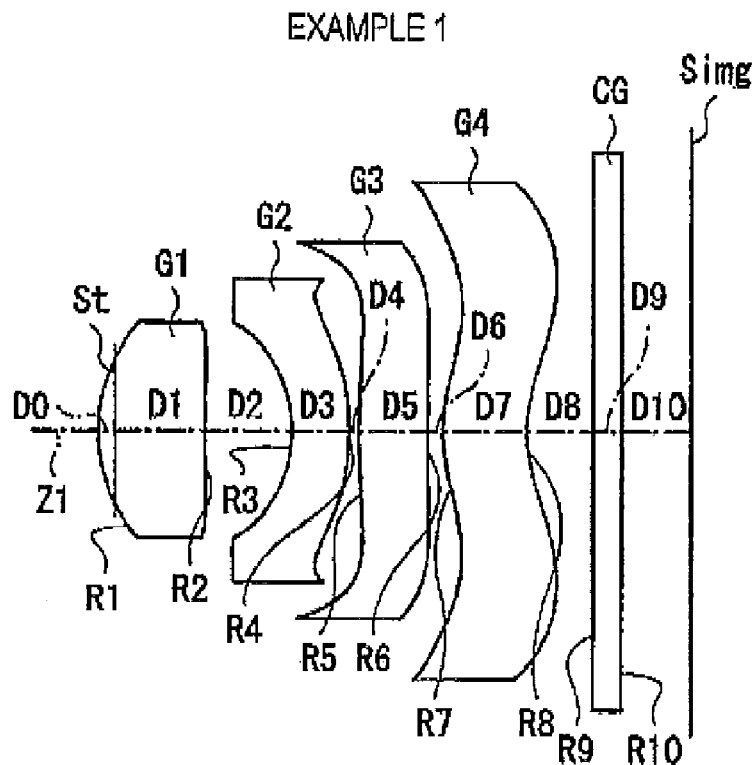
FIG. 1 is a cross-sectional view showing a first configuration example of an imaging lens which serves as an exemplary embodiment of the present invention and which corresponds to Example 1.

FIG. 1 shows a first configuration example of an imaging lens serving as an exemplary embodiment of the present invention. The configuration example corresponds to a lens configuration of a first numerical example (FIGS. 8A and 8B) to be described later. Moreover, FIGS. 2 through 7 correspond to second through seventh configuration examples of respective embodiment. A second configuration example corresponds to a lens configuration of a second numerical example (FIGS. 9A and 9B) to be described later; a third configuration example corresponds to a lens configuration of a third numerical example (FIGS. 10A and 10B) to be described later; a fourth configuration example corresponds to a lens configuration of a fourth numerical example (FIGS. 11A and 11B) to be described later; a fifth configuration example corresponds to a lens configuration of a fifth embodiment example (FIGS. 12A and 12B) to be described later; a sixth configuration example corresponds to a lens configuration of a sixth numerical example (FIGS. 13A and 13B) to be described later; and a seventh configuration example corresponds to a lens configuration of a seventh numerical example (FIGS. 14A and 14B) to be described later. In FIGS. 1 through 7, reference symbol Si designates the i-th plane provided that reference numerals are assigned so as to gradually increase with increasing distance to an image side (an imaging side). Reference symbol Ri designates a radius of curvature of a plane Si. Reference symbol Di designates on-axis surface spacing between the i-th plane Si and the (i+1)-th plane Si+1 along an optical axis Z1. Since the respective configurations axe identical to each other in terms of a basic configuration, descriptions will be provided below by means of taking, as a basic, the configuration example of the imaging lens shown in FIG. 1, and the example configurations shown in FIGS. 2 through 7 will also be described, as necessary.

This imaging lens is used while being incorporated into; for example, a portable module camera, a digital camera, or the like, using an imaging element such as a CCD and CMOS. An aperture diaphragm St, a first lens G1, a second lens G2, a third lens G3, and a fourth lens G4 are arranged in order from the object side along the optical axis Z1. An imaging element (not shown), such as a CCD, is placed on an image-formation surface (an imaging surface) Simg of the imaging lens. An optical member CG for protecting an imaging surface, such as a cover glass, an infrared-ray cut-off filter, and a low-pass filter, may also be interposed between the fourth lens G4 and the image-formation surface (the imaging surface).

The aperture diaphragm St is an optical aperture stop and may be disposed between an object-side plane apex position of the first lens G1 and an image-side plane apex position of the same. However, as in the case of the configuration examples shown in FIGS. 6 and 7, the aperture diaphragm St may also be placed on the object-side plane apex position of the first lens G1.

The first lens G1 has a positive power (positive refractive power) and has a meniscus shape in which a convex surface is directed toward the object side in the vicinity of the optical axis. However, as in the case of the configuration examples shown in FIGS. 6 and 7, the first lens G1 may also has a biconvex shape in the vicinity of the optical axis. At least one of an object-side surface and an image-side surface of the first lens G1 may be an aspherical surface; particularly, both surfaces of the first lens may be aspherical surfaces. Such a first lens G1 may be made of an optical glass having a large Abbe number.

The second lens G2 has a negative power (negative refractive power) and has a meniscus shape in which a concave surface is directed toward the object side in the vicinity of the optical axis. At least one of an object-side surface and an image-side surface of the second lens G2 may be an aspherical surface, and both surfaces of the second lens may be aspherical surfaces.

The third lens G3 has a positive power. In the configuration example shown in FIG. 1, the third lens G3 has a meniscus shape in the vicinity of the optical axis. Alternatively, as in the case of the second through seventh configuration examples shown in FIGS. 2 through 7, the third lens G3 may also has a biconvex shape in the vicinity of the optical axis. An absolute value of a radius of curvature of an object-side surface of the third lens G3 in the vicinity of the optical axis may be smaller than an absolute value of a radius of curvature of the image-side surface of the third lens G3 in the vicinity of the optical axis. At least one of an object-side surface and an image-side surface of the third lens G3 may be an aspherical surface, and both surfaces of the third lens may be aspherical surfaces. In the configuration examples shown in FIG. 1, the object-side surface of the third lens G3 is such an aspherical surface that the object-side surface in the vicinity of the optical axis is convex toward the object side and the object-side surface at the peripheral portion is concave toward the object side. In the meantime, the image-side surface in the vicinity of the optical axis is concave toward the image side and the image-side surface at the peripheral portion is convex toward the image side.

The fourth lens G4 has a negative power in the vicinity of the optical axis and has a meniscus shape in which a convex surface is directed toward the object side. At least one of an object-side surface and an image-side surface of the fourth lens G4 may be an aspherical surface. In particular, the object-side surface of the fourth lens may be an aspherical surface within the range of the effective diameter such that its positive power becomes weaker as the object-side surface approaches the peripheral portion and that its negative power becomes weaker as the image-side surface approaches the peripheral portion. In the configuration examples shown in FIG. 1, the object-side surface of the fourth lens G4 becomes convex toward the object side in the vicinity of the optical axis and concave toward the object side at the peripheral portion. In the meantime, the image-side surface is an aspherical surface which becomes concave toward the image side in the vicinity of the optical axis and which becomes convex toward the image side at the peripheral portion.

When compared with the first lens G1, the second lens G2, the third lens G3, and the fourth lens G4 are complex and has a larger shape. Therefore, each of the second lens G2, the third lens G3, and the for lens G4 may be formed from a resin material. As a result, a complex aspherical geometry is formed with high accuracy, and an attempt is made to reduce the weight of the entire imaging lens.

The imaging lens satisfies conditions equations (1) through (5) provided below, where f designates a focal length of the entirety system; f1 designates a focal length of the first lens G1; n1 designates a refractive index of the first lens G1 at the d-line; v1 designates an Abbe number of the first lens G1 at the d-line; f2 designates a focal length of the second lens G2; and f3 designates a focal length of the third lens G3, $$0.6 < f1/f < 1.0 \quad (1)$$

$$1.45 < n1 < 1.6 \quad (2)$$

$$v1 > 60 \quad (3)$$

$$0.4 < |f2/f| < 1.2 \quad (4)$$

$$0.7 < f3/f < 1.9 \quad (5)$$

Operation and advantages of the imaging lens of the present embodiment configured as mentioned above will now be described.

An imaging lens of the embodiment includes four lenses as a whole, and powers of the respective lenses are arranged as, in order from the object side, positive, negative, positive, and negative. Surface shapes of the respective lenses are appropriately set, and the specific conditional expressions are satisfied, whereby high aberration performance is maintained. Each of the first lens G1, the second lens G2, the third lens G3, and the fourth lens G4 can have at least one aspherical surface, which is more advantageous to maintain aberration performance. Moreover, the fourth lens G4 has a negative power, which is advantageous to ensure back focus. Provided that the positive power of the fourth lens G4 is too strong, difficulty is encountered in ensuring sufficient back focus. Moreover, aberration performance can be enhanced by reducing an absolute value of the radius of curvature of the object-side surface of the third lens G3 and imparting comparatively-high power to the object-side surface.

When compared with the first lens G1 through the third lens G3, the fourth lens G4 separates a light flux in each angle of view. Therefore, the image-side surface of the fourth lens G4 that is the closest to the imaging element is formed so as to become concave toward the image side in the vicinity of the optical axis and convex toward the image side at the peripheral portion, whereby an aberration is appropriately corrected at an each angle of view and an angle of incidence of a light flux into the imaging element is controlled so as to come to a given angle or less. Accordingly, unevenness in the amount of light achieved over the entire imaging surface can be lessened, which in turn becomes advantageous to correct a field curvature, distortion, or the like.

In order to ensure telecentricity; namely, that an angle of incidence of a principal ray on the imaging element becomes parallel the optical axis (the angle of incidence of the principal ray on the imaging surface comes closely to zero with respect to the normal to the imaging surface), the aperture diaphragm St may be positioned as closely as possible to the object side. In the meantime, when the aperture diaphragm St is placed at a position closer to the object side than to the surface S1, a corresponding distance (i.e., a distance between the aperture diaphragm St and the surface S1) is added as an optical path length, which becomes disadvantage in terms of miniaturization of the overall configuration. Accordingly, as a result of the aperture diaphragm St being disposed between the object-side surface of the first lens G1 and the image-side surface of the first lens, there is advantageous to ensure telecentricity and shorten the entire length of the imaging lens. Specific significance of the respective conditional expressions will be described hereunder.

The conditional expression (1) relates to a focal length f1 of the first lens G1 with respect to the focal length f of the entire system. When the focal lengths fall below the lower limit of the conditional expression (1), the positive power of the first lens G1 becomes excessively strong, which in turn incurs an increase in spherical aberration and poses difficulty in ensuring a back focus. In the meantime, when the focal lengths surpasses the upper limit, difficulty is encountered in shortening the entire length of the system and correcting a field curvature, astigmatism, and the like, and hence surpassing of the upper limit is not preferable. In particular, the imaging lens may be arranged so as to satisfy the following conditional expression (6), thereby enabling more suitable correction of aberration.

$$0.7 < f1/f < 0.9 \tag{6}$$

The conditional expression (2) and the conditional expression (3) specify dispersion at the d-line of the optical glass used in the first lens G1. The conditional expressions (2) and (3) are satisfied, whereby dispersion is suppressed and longitudinal chromatic aberration is diminished.

The conditional expression (4) relates to a focal length f2 of the second lens G2 with respect to the focal length f of the entire system. Hence, when the focal lengths fall below the lower limit of the conditional expression (4), the negative power of the second lens G2 becomes excessively high, and an increase in high-order aberration is induced. In the meantime, when the focal lengths surpasses an upper limit, the negative power of the second lens G2 becomes too weak, which in turn poses difficulty in correcting a field curvature, astigmatism, and the like. In particular, the imaging lens may be arranged so as to satisfy the following conditional expression (7), whereby aberration can be made more suitably.

$$0.5 < |f2/f| < 1.0 \tag{7}$$

The conditional expression (5) relates to a focal length f3 of the third lens G3 with respect to the focal length f of the entire system. When the focal lengths fall below excess of the lower limit of the conditional expression (5), the positive power of the third lens G3 becomes excessively, and aberration performance will become degraded, to thus fail to ensure sufficient back focus. In the meantime, when the focal length surpasses the upper limit, the positive power of the third lens G3 will become too weak, which in turn poses difficulty in sufficiently correcting aberration. In particular, a following conditional expression (8) may be satisfied, whereby ensuring of sufficient back focus and superior correction of an aberration can be performed in a well-balanced manner.

$$0.8 < f3/f < 1.9 \tag{8}$$

As described above, an imaging lens of the present embodiment is built from four lenses, and shapes of the respective lenses and arrangement of power of the lenses are appropriately set. Since the specific conditional expressions are satisfied, the imaging lens can be miniaturized, and high imaging performance can be ensured.

Next, specific numerical examples of the imaging lens of the present embodiment will be described. First through seventh numerical examples (Examples 1 to 7) will be collectively described by means of taking the first numerical example as a basis.

FIGS. 8A and 8B show, as Example 1, specific lens data corresponding to the configuration of the imaging lens shown in FIG. 1. FIG. 8A especially shows basic lens data, and FIG. 8B shows data pertaining to aspherical shapes. The i-th surface ("i"=0 through 10) assigned a reference symbol so as to gradually increase with increasing distance to the image side in correspondence with the reference symbol Si of the imaging lens shown in FIG. 1 is provided in the column of the surface number Si in the lens data shown in FIG. 8A. The column of the radius of curvature Ri shows values of radius of curvature of the i-th surface from the object side in correspondence with the reference symbol Ri shown in FIG. 1. The column of surface spacing Di also shows on-axis surface spacing between the i-th surface Si from the object side and the (i+1)-ti surface Si+1 from the object side along the optical axis, in correspondence with the reference symbols shown in FIG. 1. A unit of the radius of curvature Ri and that of the surface spacing Di are a millimeter (mm). The columns of Ndj and vdj show a value of refractive index and a value of an Abbe number of the j-th lens (i=1 through 5) from the object side, including the cover glass G, at the d-line (587.6 nm). The column of the surface spacing Di of the diaphragm shows a distance (mm) between the surface S1 and the aperture diaphragm St along the optical axis, and a negative reference symbol signifies that the aperture diaphragm St is on the image side with respect to the surface S1. The focal length f (mm) of the entire system and the value of the F number (F No.) are provided, as various sets f data, are provided outside the field shown in FIG. 8A.

All of the surfaces of the first lens G1 through the fourth lens G4 are aspherical surfaces. Basic lens data show numerical values of radii of curvature in the vicinity of the optical axis as radii of curvature of the aspherical surfaces.

In numerical values of the aspherical data shown in FIG. 8B, symbol E shows that a numerical value subsequent to the symbol is an exponent while "10" is taken as a base and that a numeral expressed by an exponential function taking "10" as a base is multiplied by a numeral preceding E. For instance, 1.0E−02 shows that $1.0 \times 10^{-2}$.

Values of respective coefficients Ai and K in the expression of the aspherical shape expressed by the following expression (ASP) are provided as aspherical data. In more detail, reference symbol Z designates the length (mm) of the normal to a tangential plane (a plane normal to an optical axis) of an apex of an aspherical surface from a point on the aspherical surface situated at a height "h" from the optical axis. En the imaging lens of Example 1, the third-order coefficient $A_3$ to the tenth-order coefficient $A_{10}$ are effectively used and represented as an aspherical coefficient $A_i$.

$$Z = C \cdot h^2 / \{1 + (1 - K \cdot C^2 \cdot h^2)^{1/2}\} + \Sigma A_i \cdot h^i \quad \text{(ASP)}$$

Z: Depth (mm) of an aspherical surface
h: Distance (height) (mm) from an optical axis to a lens surface
K: Eccentricity
C: Paraxial curvature=1/R
(R: Paraxial Radius of Curvature)
Ai: Aspherical coefficient of the i-th order ("i" designates an integer of three or more)

Figure 2:
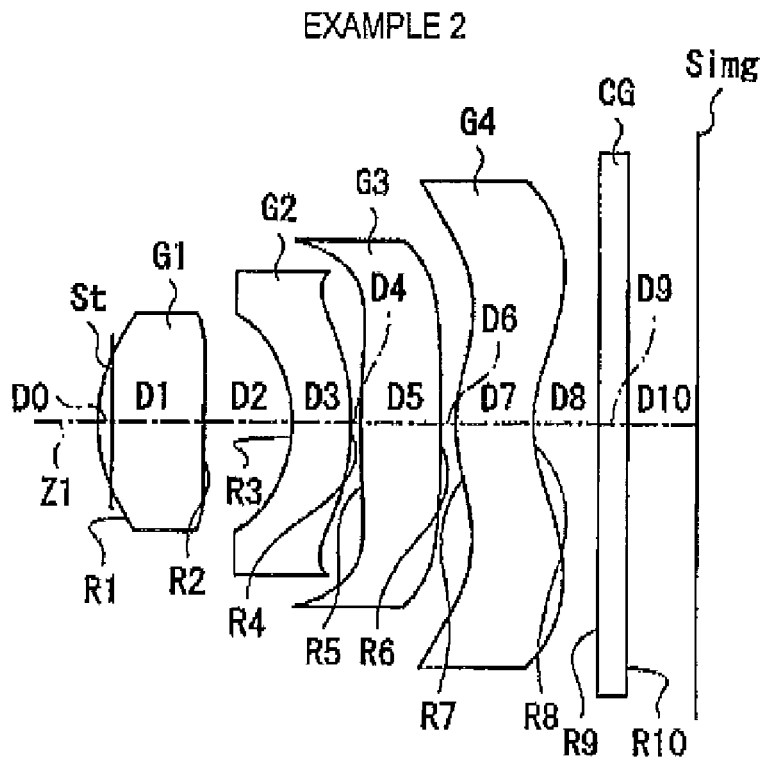
FIG. 2 is a cross-sectional view showing a second configuration example of an imaging lens which serves as an exemplary embodiment of the present invention and which corresponds to Example 2.
Figure 3:
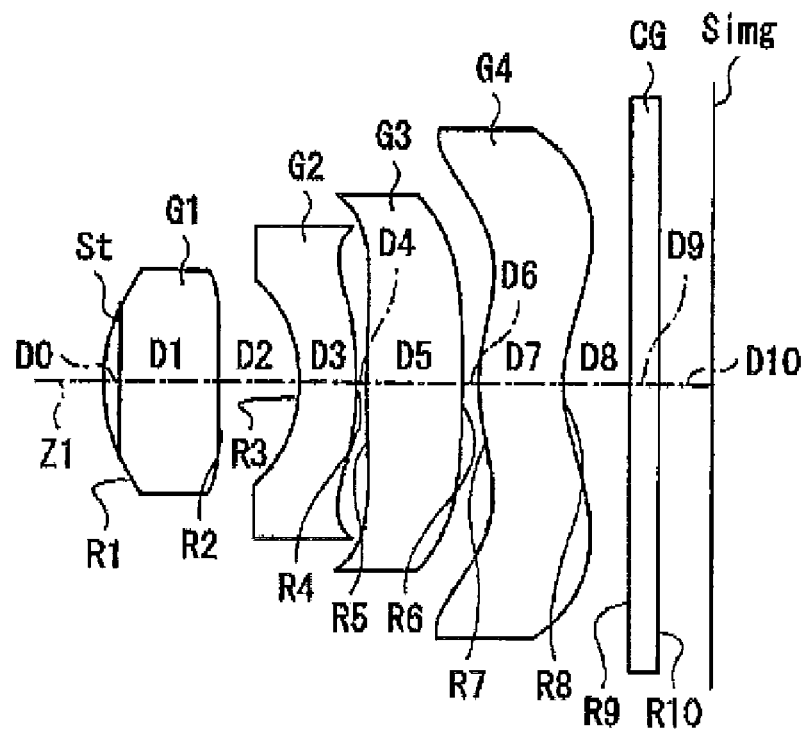
FIG. 3 is a cross-sectional view showing a third configuration example of an imaging lens which serves as an exemplary embodiment of the present invention and which corresponds to Example 3.
Figure 4:
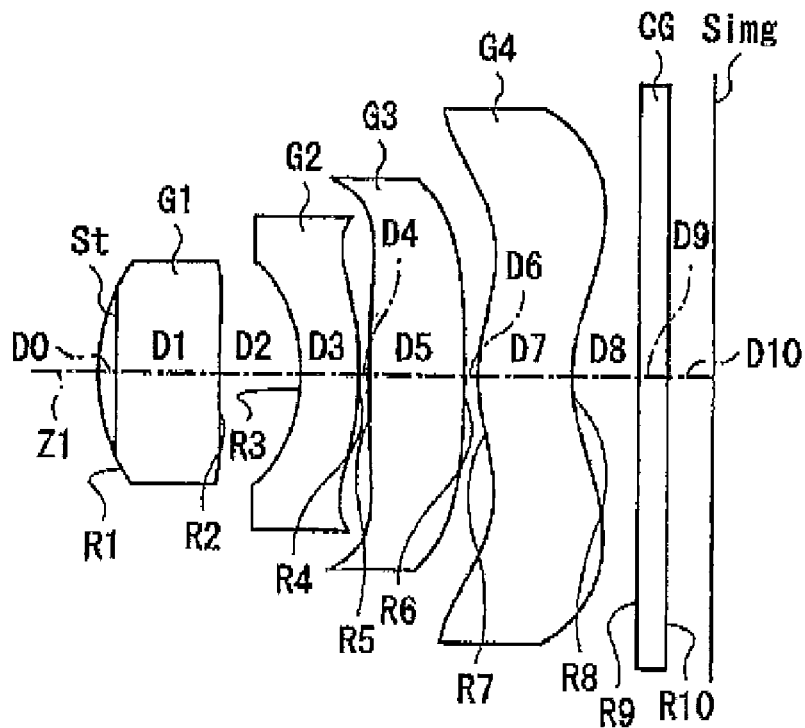
FIG. 4 is a cross-sectional view showing a fourth configuration example of an imaging lens which serves as an exemplary embodiment of the present invention and which corresponds to Example 4.
Figure 5:
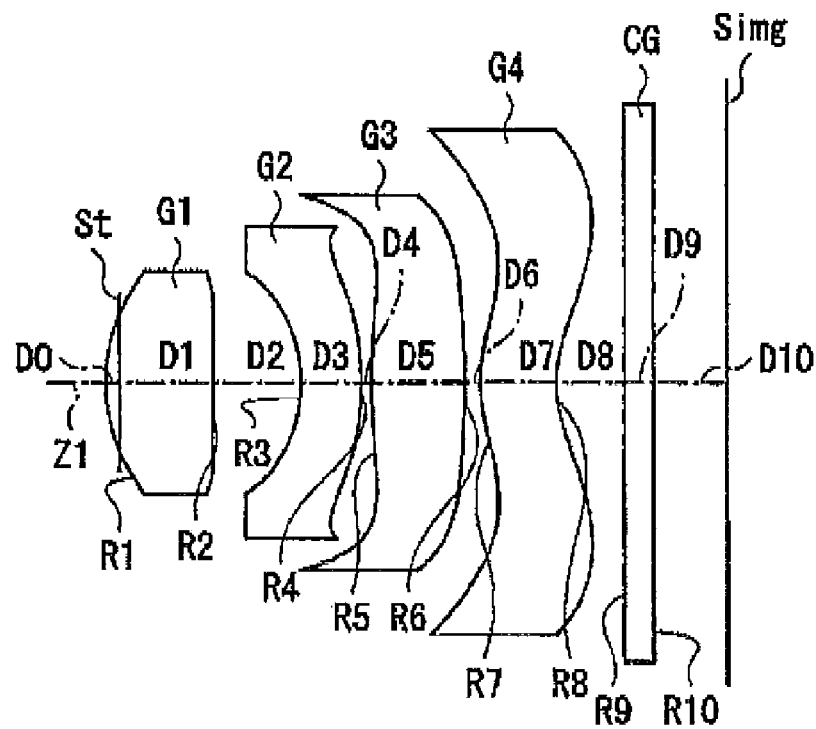
FIG. 5 is a cross-sectional view showing a fifth configuration example of an imaging lens which serves as an exemplary embodiment of the present invention and which corresponds to Example 5.
Figure 6:
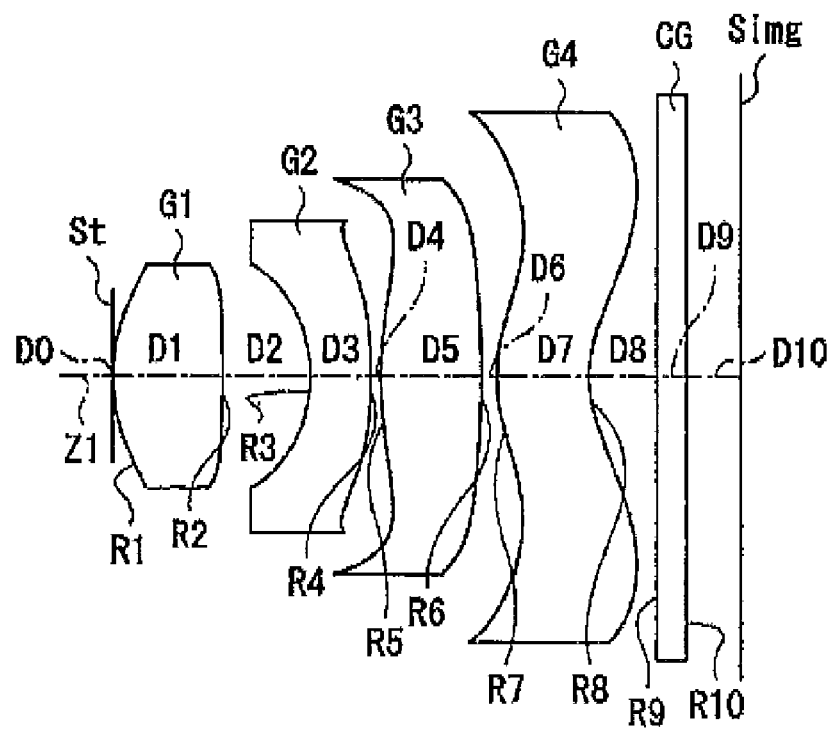
FIG. 6 is a cross-sectional view showing a sixth configuration example of an imaging lens which serves as an exemplary embodiment of the present invention and which corresponds to Example 6.
Figure 7:
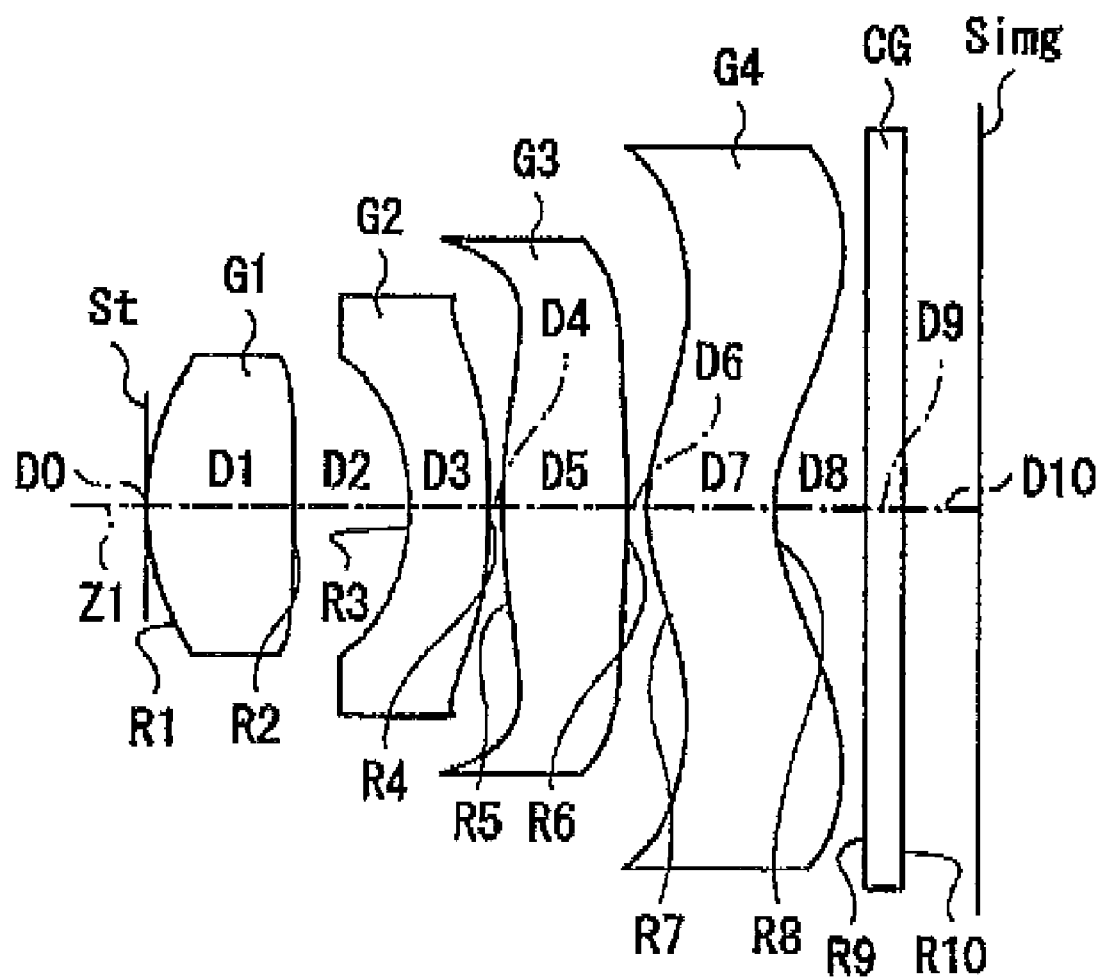
FIG. 7 is a cross-sectional view showing a seventh configuration example of an imaging lens which serves as an exemplary embodiment of the present invention and which corresponds to Example 7.

As in the case of the imaging lens of Example 1, specific lens data corresponding to die configuration of the imaging lens shown in FIG. 2 are shown Example 2 in FIGS. 9A and 9B. Likewise, specific lens data corresponding to the configuration of the imaging lens shown in FIG. 3 are shown as Example 3 in FIGS. 10A and 10B; specific lens data corresponding to the configuration of the imaging lens shown in FIG. 4 are shown as Example 4 in FIGS. 11A and 11B; specific lens data corresponding to the configuration of the imaging lens shown in FIG. 5 are shown as Example 5 in FIGS. 12A and 12B; specific lens data corresponding to the configuration of the imaging lens shown in FIG. 6 are shown as Example 6 in FIGS. 13A and 13B; and specific lens data corresponding to the configuration of the imaging lens shown in FIG. 7 are shown as Example 7 in FIGS. 14A and 14B.

FIG. 15 collectively shows values conforming to the conditional expressions (1) through (5) according to each of Examples. As shown in FIG. 15, all of the values of the respective Examples fall within the numerical ranges of the conditional expressions (1) through (5).

Figure 17A:
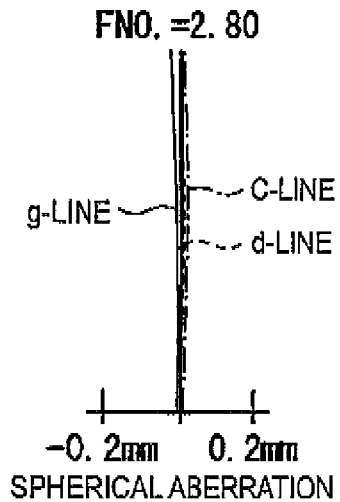
FIG. 17A shows a spherical aberration.
Figure 17B:
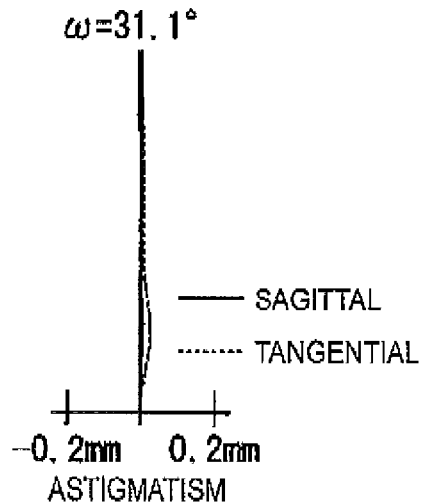
FIG. 17B shows astigmatism.
Figure 17C:
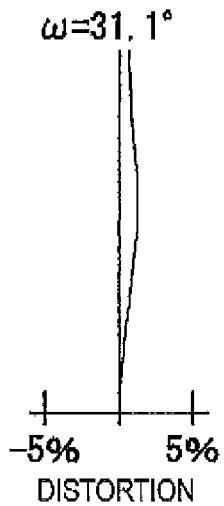
FIG. 17C shows distortion.
Figure 18A:
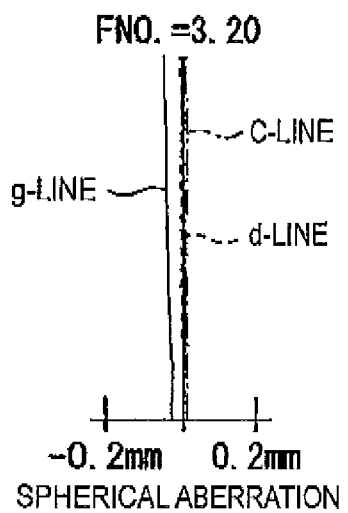
FIG. 18A shows a spherical aberration.
Figure 18B:
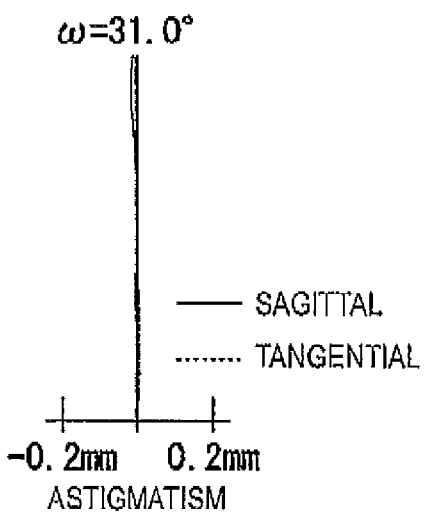
FIG. 18B shows astigmatism.
Figure 18C:
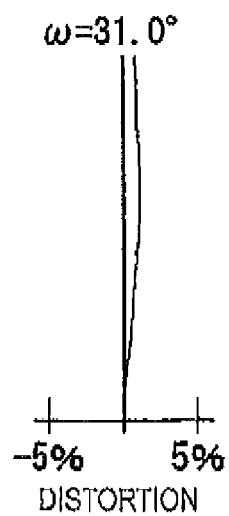
FIG. 18C shows distortion.
Figure 19A:
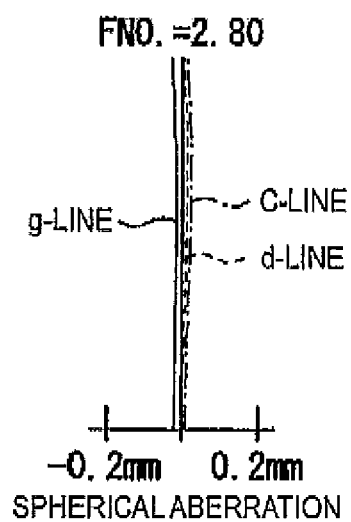
FIG. 19A shows a spherical aberration.
Figure 19B:
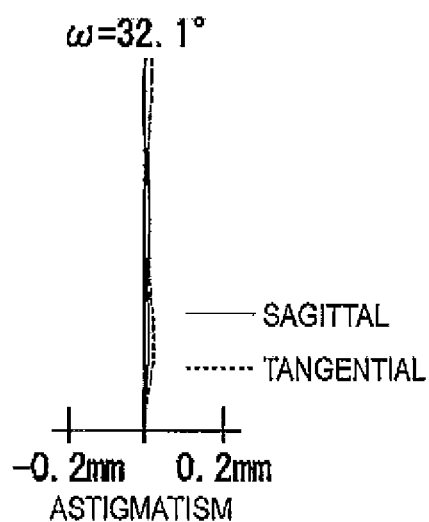
FIG. 19B shows astigmatism.
Figure 19C:
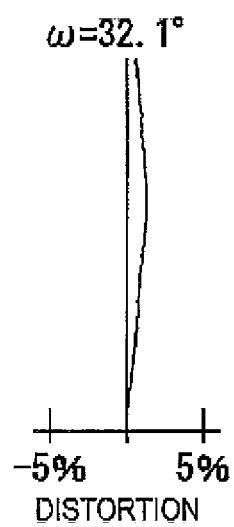
FIG. 19C shows distortion.
Figure 20A:
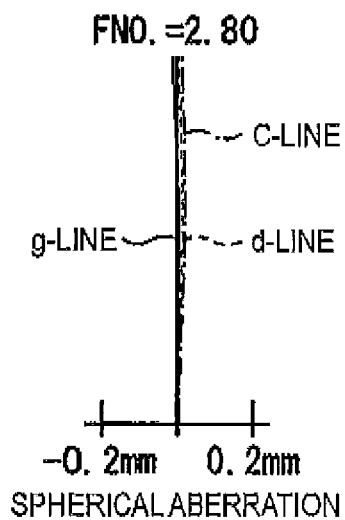
FIG. 20A shows a spherical aberration.
Figure 20B:
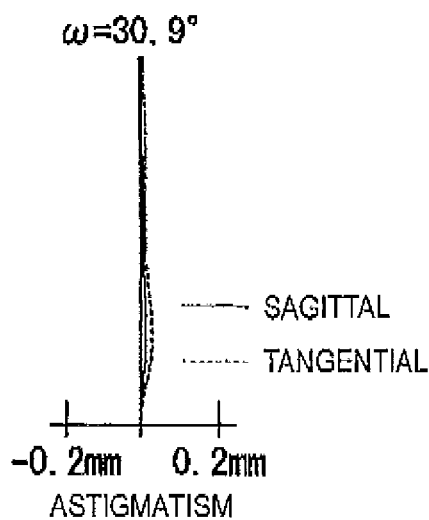
FIG. 20B shows astigmatism.
Figure 20C:
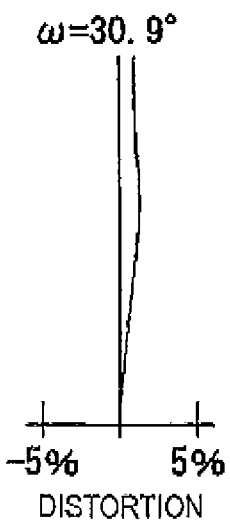
FIG. 20C shows distortion.
Figure 21A:
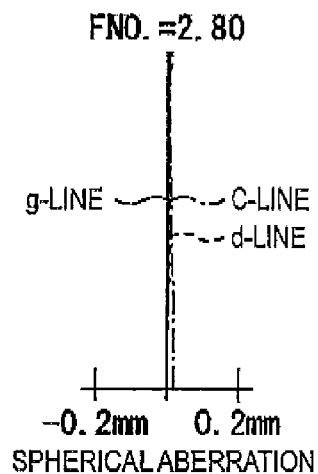
FIG. 21A shows a spherical aberration.
Figure 21B:
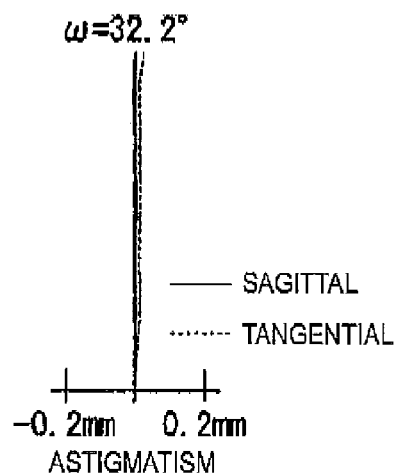
FIG. 21B shows astigmatism.
Figure 21C:
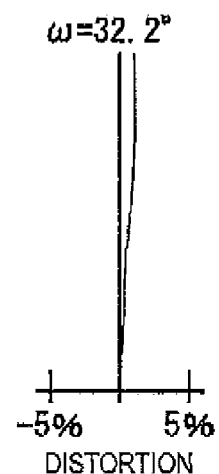
FIG. 21C shows distortion.
Figure 22A:
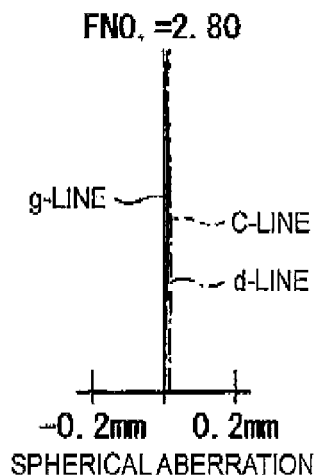
FIG. 22A shows a spherical aberration.
Figure 22B:
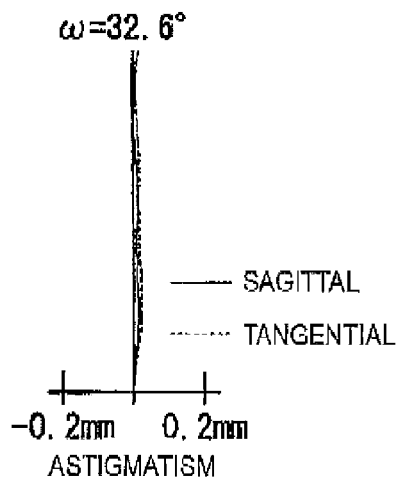
FIG. 22B shows astigmatism.
Figure 22C:
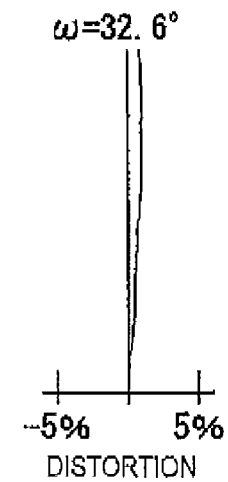
FIG. 22C shows distortion.

FIGS. 16A to 16C show spherical aberration, astigmatism, and distortion of the imaging lens of Example 1. Each of aberration diagrams shows aberration acquired when the d-line is taken as a reference wavelength, and the spherical aberration diagrams also show aberrations achieved at the g-line (a wavelength of 435.8 nm) and the C-line (a wavelength of 656.3 nm). In astigmatism diagrams, a solid line shows aberration achieved in a saggital direction, and a broken line shows aberration achieved in a tangential direction, Likewise, aberrations in Example 2 are shown in FIGS. 17A through 17C; aberrations in Example 3 are shown in FIGS. 18A through 18C; aberrations in Example 4 are shown in FIGS. 19A through 19C; aberrations in Example 5 are shown in FIGS. 20A through 20C; aberrations in Example 6 are shown in FIGS. 21A through 21C; and aberrations in Example 7 are shown in FIGS. 22A through 22C.

As is evident from the foregoing respective sets of numerical data and aberration diagrams, a lens configuration totally formed from lenses exhibits extremely superior aberration performance for each of Examples.

Although the present invention has been described by reference to several embodiments and examples, the present invention is not limited to these embodiments and examples and is susceptible to various modifications. For instance, curvature radii, surface spacing, and refractive indices of respective lens components are not limited to values represented by the respective numerical examples and may assume other values. Although the embodiments and the examples have been described such that both surfaces of the first through fourth lenses can have aspherical surfaces, the present invention is not limited to the embodiments and the examples.

This application claims foreign priority from Japanese Patent Application Nos. 2007-19475 filed Jan. 30, 2007, the contents of which is herein incorporated by reference.

What is claimed is:

1. An imaging lens comprising: in order from an object side of the imaging lens,
   a first lens having a positive refractive power and having a convex surface on the object side;
   a second lens having a negative refractive power and having a concave surface on the object side;
   a third lens having a positive refractive power; and
   a fourth lens of a meniscus lens having a negative refractive power and having a convex surface on the object side,
   the imaging lens satisfying conditional expressions:

$0.6 < f1/f < 1.0$ (1)

$1.45 < n1 < 1.6$ (2)

$v1 > 60$ (3)

$0.4 < |f2/f| < 1.2$ (4)

$0.7 < f3/f < 1.9$ (5)

wherein
   f represents a focal length of the imaging lens;
   f1 represents a focal length of the first lens;
   n1 represents a refractive index of the first lens at the d-line;
   v1 represents an Abbe number of the first lens at the d-line;
   f2 represents a focal length of the second lens; and
   f3 represents a focal length of a third lens, wherein an absolute value of a radius of curvature of an object side surface of the third lens in the vicinity of the optical axis is smaller than that of an image side surface of the third lens in the vicinity of the optical axis.

2. The imaging lens according to claim 1, wherein each of the second lens, the third lens, and the fourth lens has at least one aspherical surface.

3. The imaging lens according to claim 2, wherein the first lens has at least one aspherical surface.

4. The imaging lens according to claim 3, wherein each of the second lens, the third lens, and the fourth lens is made of a resin material.

5. The imaging lens according to claim 4, wherein the first lens is made of an optical glass.

6. The imaging lens according to claim 5, further comprising an aperture diaphragm between a position of an object-side surface of the first lens on the optical axis and a position of an image-side surface of the first lens on the optical axis.

7. The imaging lens according to claim 1, wherein the first lens has at least one aspherical surface.

8. The imaging lens according to claim 7, wherein the first lens is made of an optical glass.

9. The imaging lens according to claim 8, further comprising an aperture diaphragm between a position of an object-side surface of the first lens on the optical axis and a position of an image-side surface of the first lens on the optical axis.

10. The imaging lens according to claim 1, wherein each of the second lens, the third lens, and the fourth lens is made of a resin material.

11. The imaging lens according to claim 10, further comprising an aperture diaphragm between a position of an object-side surface of the first lens on the optical axis and a position of an image-side surface of the first lens on the optical axis.

12. The imaging lens according to claim 2, wherein each of the second lens, the third lens, and the fourth lens is made of a resin material.

13. The imaging lens according to claim 12, wherein the first lens is made of an optical glass.

14. The imaging lens according to claim 13, further comprising an aperture diaphragm between a position of an object-side surface of the first lens on the optical axis and a position of an image-side surface of the first lens on the optical axis.

15. The imaging lens according to claim 3, wherein the first lens is made of an optical glass.

16. The imaging lens according to claim 15, further comprising an aperture diaphragm between a position of an object-side surface of the first lens on the optical axis and a position of an image-side surface of the first lens on the optical axis.

17. The imaging lens according to claim 1, further comprising an aperture diaphragm between a position of an object-side surface of the first lens on the optical axis and a position of an image-side surface of the first lens on the optical axis.

18. An imaging lens comprising: in order from an object side of the imaging lens,
    a first lens having a positive refractive power and having a convex surface on the object side;
    a second lens having a negative refractive power and having a concave surface on the object side;
    a third lens having a positive refractive power; and
    a fourth lens of a meniscus lens having a negative refractive power and having a convex surface on the object side,
    the imaging lens satisfying conditional expressions:

$$0.6 < f1/f < 1.0 \quad (1)$$

$$1.45 < n1 < 1.6 \quad (2)$$

$$v1 > 60 \quad (3)$$

$$0.4 < |f2/f| < 1.2 \quad (4)$$

$$0.88 < f3/f < 1.9 \quad (5)$$

wherein
    f represents a focal length of the imaging lens;
    f1 represents a focal length of the first lens;
    n1 represents a refractive index of the first lens at the d-line;
    v1 represents an Abbe number of the first lens at the d-line;
    f2 represents a focal length of the second lens; and
    f3 represents a focal length of a third lens.

19. The imaging lens according to claim 18, wherein each of the second lens, the third lens, and the fourth lens has at least one aspherical surface.

20. The imaging lens according to claim 19, wherein the first lens has at least one aspherical surface.

21. The imaging lens according to claim 20, wherein an absolute value of a radius of curvature of an object-side surface of the third lens in the vicinity of the optical axis is smaller than that of an image-side surface of the third lens in the vicinity of the optical axis.

22. The imaging lens according to claim 21, wherein each of the second lens, the third lens, and the fourth lens is made of a resin material.

23. The imaging lens according to claim 22, wherein the first lens is made of an optical glass.

24. The imaging lens according to claim 23, further comprising an aperture diaphragm between a position of an object-side surface of the first lens on the optical axis and a position of an image-side surface of the first lens on the optical axis.

25. The imaging lens according to claim 18, wherein the first lens has at least one aspherical surface.

26. The imaging lens according to claim 25, wherein an absolute value of a radius of curvature of an object-side surface of the third lens in the vicinity of the optical axis is smaller than that of an image-side surface of the third lens in the vicinity of the optical axis.

27. The imaging lens according to claim 26, wherein the first lens is made of an optical glass.

28. The imaging lens according to claim 27, further comprising an aperture diaphragm between a position of an object-side surface of the first lens on the optical axis and a position of an image-side surface of the first lens on the optical axis.

29. The imaging lens according to claim 18, wherein an absolute value of a radius of curvature of an object-side surface of the third lens in the vicinity of the optical axis is smaller than that of an image-side surface of the third lens in the vicinity of the optical axis.

30. The imaging lens according to claim 29, wherein each of the second lens, the third lens, and the fourth lens is made of a resin material.

31. The imaging lens according to claim 30, further comprising an aperture diaphragm between a position of an object-side surface of the first lens on the optical axis and a position of an image-side surface of the first lens on the optical axis.

32. The imaging lens according to claim 18, wherein each of the second lens, the third lens, and the fourth lens is made of a resin material.

33. The imaging lens according to claim 32, wherein the first lens is made of an optical glass.

34. The imaging lens according to claim 33, further comprising an aperture diaphragm between a position of an object-side surface of the first lens on the optical axis and a position of an image-side surface of the first lens on the optical axis.

35. The imaging lens according to claim 20, wherein the first lens is made of an optical glass.

36. The imaging lens according to claim 35, further comprising an aperture diaphragm between a position of an object-side surface of the first lens on the optical axis and a position of an image-side surface of the first lens on the optical axis.

37. The imaging lens according to claim 18, further comprising an aperture diaphragm between a position of an object-side surface of the first lens on the optical axis and a position of an image-side surface of the first lens on the optical axis.

* * * * *